Figure 1:
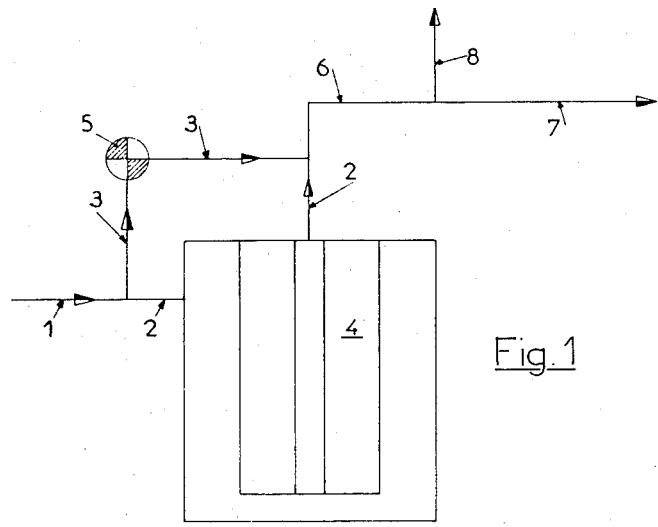

United States Patent [19]
Marion

[11] 3,805,921
[45] Apr. 23, 1974

[54] LUBRICANT CIRCUIT

[75] Inventor: Gerard Marion, Bron, France

[73] Assignee: Automobiles M. Berliet, Lyon, France

[22] Filed: Mar. 20, 1972

[21] Appl. No.: 235,900

[30] Foreign Application Priority Data
Mar. 12, 1971 France .............................. 71.09631

[52] U.S. Cl. .................................. 184/6.4, 184/6.24
[51] Int. Cl. ........................................ F01m 1/18
[58] Field of Search ................... 184/6.21, 6.24, 6.4; 123/196 A; 210/168

[56] References Cited
UNITED STATES PATENTS
| | | | |
|---|---|---|---|
| 2,979,160 | 4/1961 | Haas | 184/6.24 |
| 2,231,722 | 2/1941 | Johnson | 210/168 X |
| 2,473,727 | 6/1949 | Robertson | 210/168 X |
| 2,639,783 | 5/1953 | Kovacs | 184/6.24 |

FOREIGN PATENTS OR APPLICATIONS
249,460  4/1926  Great Britain ...................... 184/6.24

*Primary Examiner*—Manuel A. Antonakas
*Attorney, Agent, or Firm*—Weiner, Basile and Weintraub

[57] ABSTRACT

A lubricant circuit for engines, and in particular diesel engines, includes a common supply pipe having a by-pass valve and a filtering means connected thereto through separate inlets having a common junction with the supply conduit. A branch conduit interconnects filtering means and the outlet conduit from the by-pass. A non-return valve disposed in the branch conduit prevents the flow of lubricant from the outlet from the by-pass to a first outlet connected to the branch conduit between the filtering means and the non-return valve.

5 Claims, 2 Drawing Figures

LUBRICANT CIRCUIT

The present invention relates to a lubricant circuit for a supercharged heat engine to assure the lubrication of both the engine and of a turbocompressor of the supercharger.

To function efficiently, turbocompressors demand a particularly careful filtering of the lubricating oil. This can be achieved with filters, usually paper cartridge filters, which provide a degree of fineness of filtration of 20 microsn or less. On the other hand, the heat engine, which is usually a diesel engine, tolerates a much less fine degree of filtration.

Generally, lubricant for the diesel engine and the supercharger's turbocompressor is circulated by a common pump through the respective oil circuits. It is known to employ a filter of a quality that is satisfactory for the turbocompressor, and to use it to filter all the lubricant to the quality demanded by the turbocompressor. This solution is inexpensive and attractive for an operator who has only one filter to maintain, and it is beneficial to the engine which receives a very well filtered oil.

However, it is necessary to provide a by-pass valve on the filter, which serves to protect the engine from a lack of lubricant should the filter become clogged up, and to avoid the bursting of the filter cartridge in case of excess pressure (when starting from cold). Such a by-pass valve is mounted in parallel with the filter, that is to say, when it opens, unfiltered oil is circulated temporarily, not only to the engine, but also to the turbocompressor. The latter therefore is prone to damage every time the by-pass opens.

The present invention aims at avoiding this disadvantage by creating a lubricant circuit which, using one pump, allows the safe circulation of lubricant to both a heat engine and a supercharger's turbocompressor.

Thus according to the present invention a lubricant circuit comprises a filter and a by-pass valve having inlet conduits connected together at a junction with a common lubricant supply conduit, a first outlet conduit from the filter for conveying lubricant to a turbocompressor, a second outlet conduit from the by-pass valve for conveying lubricant to a heat engine and a non-return valve in a branch conduit connected between the outlet conduits and operable to prevent the flow of lubricant from the second to the first of said outlet conduits.

Figure 2:
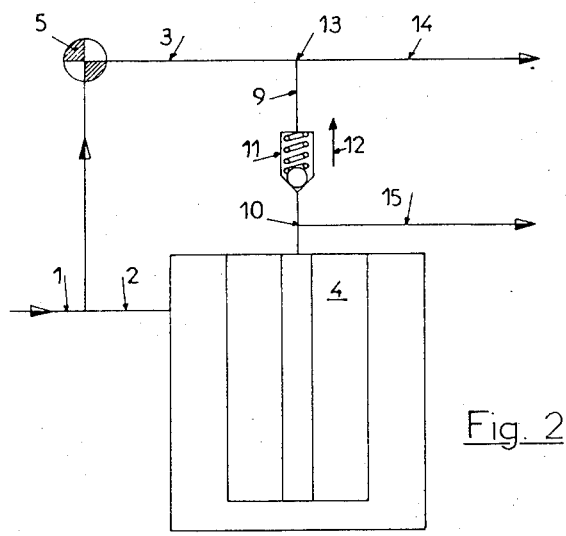

The invention will be described further by way of example, with reference to the accompanying drawings, in which:

FIG. 1 is a diagram showing a known lubricant circuit for supplying lubricant to both an engine and a supercharger's turbocompressor, and, FIG. 2 is a diagram of a circuit according to the present invention.

With reference to FIG. 1 a supply pipe 1 receives lubricating oil from a pump (not shown). This pipe 1 divides into two protions 2 and 3 leading respectively to a cartridge filter 4 and to an automatic by-pass valve 5. Downstream of the filter 4 and to valve 5, which are thus mounted in parallel the portions 2 and 3 recombine into a single pipe 6, which divides, in turn, into two portions 7 and 8 which lead, the first to a lubricating circuit of a diesel engine, the second to a lubricating circuit of a supercharger's turbocompressor.

It can be seen that every time the valve 5 is open, e.g. in case of clogging up of the cartridge filter 4 or at the time of a start from cold, unfiltered oil flows directly from the common supply conduit or pipe 1 to the pipe 6, that is to say equally to the engine (pipe portion 7) and to its turbocompressor (pipe portion 8). This results in a serious risk for the good working of the turbocompressor.

As shown in FIG. 2, there is provided first and second inlet conduits or pipes 2 and 3, respectively, connected at a common junction with the common supply conduit 1. A filter or filtering means 4 is disposed in the first inlet conduit 2 and a by-pass means 5 is connected to the second conduit 3. There is provided at the outlet from the filter 4, a branch conduit or pipe 9 having a junction 10, and a non-return valve 11. This valve 11 prevents any circulation of oil in the direction of the filter 4. Thus in pipe 9 oil can circulate only in the direction of the arrow 12. Downstream of the valve 11, the pipe 9 rejoins, at a junction 13, the pipe 3. Junction 13 is connected to a second outlet conduit or pipe 14 which feeds the lubricating circuit of the diesel engine.

On the other hand, the junction 10 positioned between the filter 4 and the non-return valve 11 is connected to a first outlet condiut or pipe 15 leading only to the lubricating circuit of the engine related element, i.e., the turbocompressor.

Under these conditions, it can be seen that if a blockage occurs inside the filter 4, the by-pass valve 5 opens in the usual way, so that the engine temporarily receives unfiltered oil through the pipe 14. However, pipe 15 of the turbocompressor receives oil only when the filter 4 is working normally, i.e. the turbocompressor is never supplied with oil which has passed directly through the valve 5, without being filtered.

I claim:
1. A lubricant circuit comprising:
   a. a common lubricant supply conduit,
   b. a first inlet conduit extending from the supply conduit,
   c. filtering means disposed in the first inlet conduit,
   d. a second inlet conduit extending from the supply conduit,
   e. by-pass means connected to the second inlet conduit,
   f. a first outlet conduit from the filtering means and connected to an engine related element,
   g. a second outlet conduit from the by-pass means and connected to an engine,
   h. a branch conduit interconnecting the first and second outlet conduits, and
   i. a non-return valve disposed in the branch conduit and operable to prevent the flow of lubricant from the second outlet conduit to the first outlet conduit.

2. The lubricant circuit of claim 1 wherein the engine is a diesel engine.

3. The lubricant circuit of claim 1 wherein the engine related element is a turbocompressor.

4. The lubricant circuit of claim 1 wherein the first and second inlet conduits have a common junction with the common supply conduit.

5. The lubricant circuit of claim 1 wherein the first outlet conduit is connected to the branch conduit between the filtering means and the non-return valve.

* * * * *